(12) United States Patent
Toriumi

(10) Patent No.: US 8,736,771 B2
(45) Date of Patent: May 27, 2014

(54) DISPLAY APPARATUS, COMMUNICATION APPARATUS, DISPLAYING METHOD AND PROGRAM RECORDING MEDIUM

(71) Applicant: Go Toriumi, Tokyo (JP)

(72) Inventor: Go Toriumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/947,609

(22) Filed: Jul. 22, 2013

(65) Prior Publication Data

US 2013/0308050 A1 Nov. 21, 2013

Related U.S. Application Data

(62) Division of application No. 13/144,488, filed as application No. PCT/JP2010/050740 on Jan. 15, 2010, now Pat. No. 8,537,280.

(30) Foreign Application Priority Data

Jan. 29, 2009 (JP) .................................. 2009-017591

(51) Int. Cl.
*H04N 5/44* (2011.01)
*H04N 5/455* (2006.01)
*H04N 5/50* (2006.01)

(52) U.S. Cl.
USPC ............................ 348/725; 348/726; 348/731

(58) Field of Classification Search
USPC .......... 348/725–728, 731–733; 375/354, 355, 375/362; 345/213
IPC ...................................... H04N 5/44,5/50, 5/455
See application file for complete search history.

(56) References Cited

U.S. PATENT DOCUMENTS

| | | | | |
|---|---|---|---|---|
| 7,194,032 B1 * | 3/2007 | Easwar et al. | ........... | 375/240.12 |
| 2004/0003399 A1 * | 1/2004 | Cooper | .......................... | 348/731 |
| 2004/0160974 A1 * | 8/2004 | Read et al. | .................... | 370/431 |
| 2006/0242240 A1 * | 10/2006 | Parker et al. | .................. | 709/205 |
| 2007/0266398 A1 * | 11/2007 | Vandaele | ........................ | 725/38 |

* cited by examiner

*Primary Examiner* — Sherrie Hsia
(74) *Attorney, Agent, or Firm* — Sughrue Mion, PLLC

(57) ABSTRACT

Provided is a display method which can avoid the load increase and display rapidly the video of the selected channel. The display method includes adjusting a timing, in which a video is displayed based on a predetermined reference frame received and decoded at first after channel selection, toward shifting earlier than a time originally displaying the video based on a time information attached to the reference frame.

15 Claims, 4 Drawing Sheets

DISPLAY APPARATUS, COMMUNICATION APPARATUS, DISPLAYING METHOD AND PROGRAM RECORDING MEDIUM

This application is a Divisional application of Ser. No. 13/144,488 filed on Jul. 13, 2011 and claims the benefit of priority prior International Application PCT/JP2010/050740, filed Jan. 15, 2010, Japanese Patent Application No. 2009-017591, filed on Jan. 29, 2009, the entire contents of all of which are incorporated herein by reference.

TECHNICAL FIELD

The present invention relates to a display apparatus, a communication apparatus, a displaying method and a program recording medium which displays a video obtained by digital broadcasting and so on.

BACKGROUND ART

In recent years, a portable electronic apparatus has remarkable progress for becoming multifunctional and advanced functionality. A mobile phone will be considered as an example. Each mobile phone manufacturer has developed the mobile phone with not only a native function as telephone but also a plurality of advanced functions under a situation that the number of mobile phone owners is increasing rapidly. As a result, the mobile phone gets to have enhanced convenience.

The functions equipped in the mobile phones, for example, are a digital camera function with megapixels, a navigation function using GPS (Global Positioning System) and a television (TV) function which receives TV broadcasting including digital broadcasting.

By using the TV function that a mobile phone has, when a user is watching TV broadcasting, the user may switch a channel to other channels. At this time, in a case of digital broadcasting, the mobile phone executes a synchronizing processing in a tuner, a processing which interprets a program information, a waiting processing for data or the like before changing to the other channels. Hence, the mobile phone cannot smoothly switch the channel in digital broadcasting compared with a case of analog broadcasting.

In a digital broadcasting system, it is general to multiplex a coded video and a coded sound with a multiplexing format and deliver that multiplexed data. As a method of coding video, for example, there are MPEG (Moving Picture Experts Group)-2 video and H.264/AVC (Advanced Video Coding). As a method of coding sound, for example, there are MPEG (Moving Picture Experts Group)-1 audio and AAC (Advanced Audio Coding). As the multiplexing format, for example, there is MPEG-2 transport stream.

In an IPTV (Internet Protocol TeleVision) system, it becomes general to deliver a data multiplexed with the MPEG-2 transport stream by IP (Internet Protocol) protocol similarly to the above mentioned.

When the above-mentioned data is received, the mobile phone establishes synchronization for a physical layer (such as a TV tuner in the case of TV broadcasting), at first. The mobile phone interprets a stream configuration based on a broadcast stream (such as the MPEG-2 transport stream) obtained after establishing the synchronization for the physical layer. Based on this interpretation, the mobile phone separates a video signal and a sound signal, and executes a decoding processing. At this time, the mobile phone extracts a broadcast reference clock (PCR (Program Clock Reference) in the case of MPEG-2 transport stream) from the stream. Next, the mobile phone generates a clock (STC (System Time Clock)), which is synchronizing with a broadcast wave, inside the receiver. Finally, in conformity with System Time Clock, the mobile phone transmits the decoded video and the decoded sound data to a display and a speaker based on a time-stamp to which the decoded video and sound data are respectively attached. As a result, the display of the mobile phone begins to display a video of the selected channel, and the speaker of the mobile phone begins to output a sound of the selected channel. And then, the user can begin to watch the stream after the cannel selection.

The successive operations (that is, the processing which establishes the synchronization for the physical layer, the processing which interprets the stream configuration, the processing which separates each data, the processing which decodes each data and the synchronization processing which utilizes the time-stamp) take time respectively. For example, in a case of One Seg (One Segment broadcasting, Partial reception service of one segment for mobile phone and mobile terminal) in Japan, it generally takes longer than four seconds so that the mobile phone displays the video based on the successive operations after a user selects. In other words, a user is barely able to watch the video of the selected channel after passing longer than four seconds from the channel selection.

As technology for reducing a waiting time on the channel changing, for example, there is a technology disclosed in a patent document 1. In the technology disclosed by the patent document 1, a demodulated data regarding all channels is stored in a buffer for each channel. And when the channel is changed, the demodulated data is read from the buffer.

CITATION LIST

[Patent Literature 1] Japanese Patent Application Laid-Open No.

SUMMARY OF INVENTION

Technical Problem

When the technology disclosed in the patent document 1 is used, a following problem takes place. That is, because the buffer has to be prepared for each channel, it is necessary to increase a capacity of a memory in the mobile phone. In addition, because of demodulating the data about all channels, the mobile phone takes a heavy load.

In order to solve the above-mentioned problems, the present invention has been made. That is, an object of the present invention is mainly to provide a display apparatus, a communication apparatus, a displaying method and a program recording medium which can avoid the load increase and display rapidly the video of the selected channel.

Solution to Problem

A display apparatus in the present invention includes:
synchronizing means for adjusting a timing, in which a video is displayed based on a predetermined reference frame received and decoded at first after channel selection, toward shifting earlier than a time originally displaying the video based on a time information attached to the reference frame.

A communication apparatus in the present invention includes:
the display apparatus according to the present invention.

A displaying method in the present invention includes:
decoding a predetermined reference frame received at first after channel selection; and displaying a video based on the decoded reference frame earlier than a timing when the reference frame is displayed based on a time information attached to the non-reference frame.

A program recording medium storing a program to make a display apparatus have a function, the function achieved by performing the program comprising:

decoding a predetermined reference frame received at first after channel selection; and displaying a video based on the decoded reference frame earlier than a timing when the reference frame is displayed based on a time information attached to the non-reference frame.

Advantageous Effects of Invention

According to the present invention, the display apparatus can avoid the load increase and display rapidly the video of the selected channel.

DESCRIPTION OF EMBODIMENTS

<A First Exemplary Embodiment>

The first exemplary embodiment according to the present invention will be described with reference to the drawings.

Figure 1:
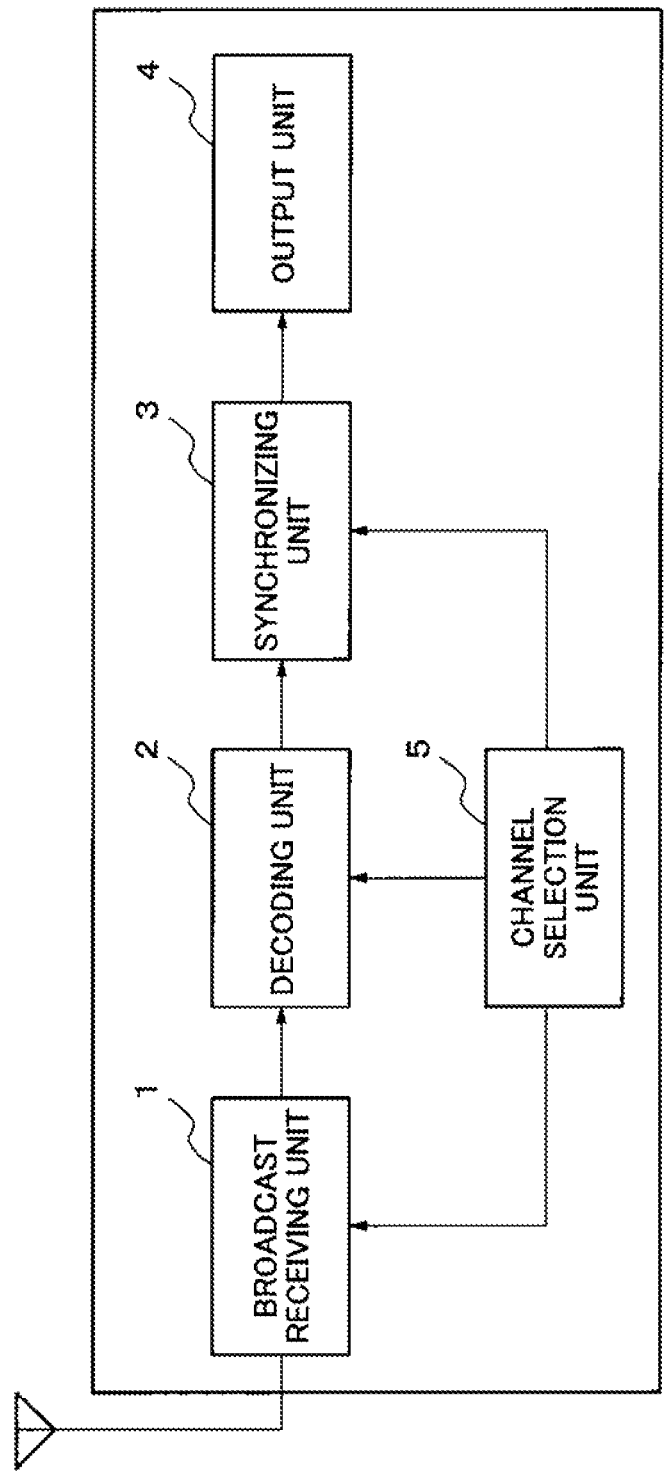
FIG. 1 is a block diagram which shows an exemplary embodiment of a display apparatus according to the present invention.

FIG. 1 is a block diagram showing a display apparatus in the first exemplary embodiment.

As shown in FIG. 1, the display apparatus in the first exemplary embodiment includes a broadcast receiving unit (broadcast receiving means) 1, a decoding unit (decoding means) 2, a synchronizing unit (synchronizing means) 3, an output unit (output means) 4 and a channel selection unit (channel selection means) 5.

The broadcast receiving unit 1 has a function of receiving a broadcast signal (digital television broadcasting, digital radio, IPTV and so on) corresponding to a frequency or a channel designated by the channel selection unit 5 and transmitting the received signal to the decoding unit 2.

The decoding unit 2 has a function of extracting a video data and a sound data from the signal received from the broadcast receiving unit 1. The decoding unit 2 further has a function of discarding the video data (a video frame) sequentially during a period from starting to extract the video data after the channel selection until obtaining a video data which has become a predetermined key frame (a reference frame). The decoding unit 2 further has a function of decoding the extracted video data to the non-compressed data, in order that a display device can display a video based on the extracted video data after obtaining first the video data which becomes the key frame after the channel selection. Furthermore, the decoding unit 2 has a function of attaching a time-stamp to the decoded video frame and transmitting the video frame to the synchronizing unit 3. The key frame is a frame which can be watched with itself as a perfect video (image) by decoded and becoming the non-compression state like the MPEG-2, or like an I (Intra-coded) frame of H.264. Further, the key frame may be an IDR (Instantaneous Decoder Refresh) frame or may not be an IDR frame in H.264.

The synchronizing unit 3 has a function of transmitting the video frame and the sound frame received from the decoding unit 2 to the output unit 4 based on a timing (a normal outputting time) when the time-stamp attached in the frame represents. In this first exemplary embodiment, the synchronizing unit 3 further has a function of outputting immediately the video frame (the key frame) which is transmitted at first from the decoding unit 2 after the channel selection without matching the timing when the time-stamp represents in a case of detecting that it is just after the channel selection based on a information obtained from the channel selection unit 5.

The output unit 4 includes a video displaying unit and a sound outputting unit. The video displaying unit has a function of displaying the video based on the video frame received from the synchronizing unit 3. For example, the video displaying unit is LCD (Liquid Crystal Display). The sound outputting unit has a function of outputting the sound based on the sound frame. For example, the sound outputting unit is a speaker. In other words, the output unit 4 has a function of outputting the video frame and the sound frame in a form that a user can understand.

The channel selection unit 5 has a function of transmitting an information which represents a frequency or a channel which a user selects for the broadcast receiving unit 1 when carrying out a operation changing from the channel being displayed to the other channels or starting to display the TV broadcast. The channel selection unit 5 further has a function of informing the decoding unit 2 and the synchronizing unit 3 that it is just after the channel selection at the same time as transmitting the information.

Figure 2:
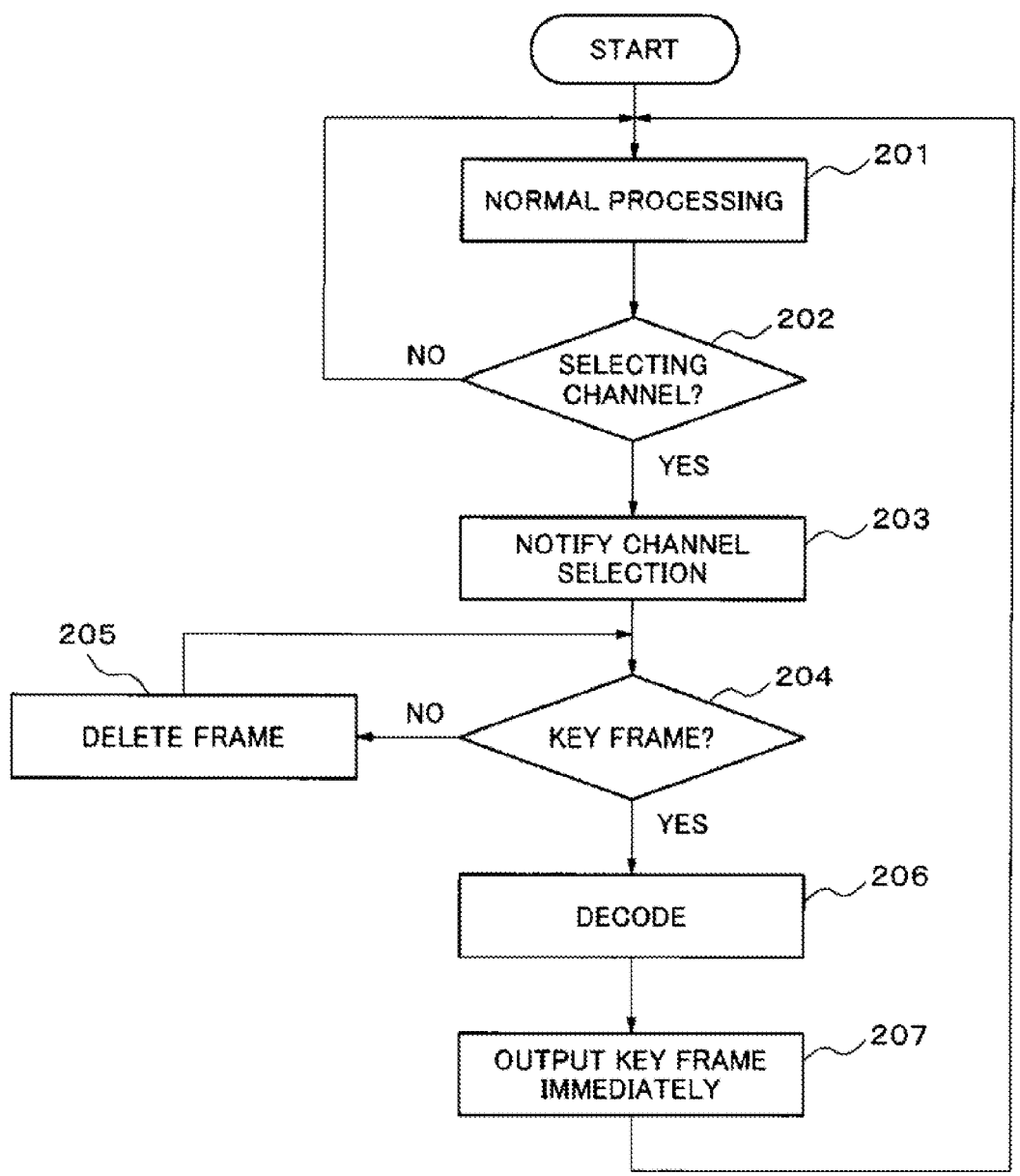
FIG. 2 is a flow chart which illustrates an operation example of the display apparatus in the exemplary embodiment.

Next, a example of an operation of the display apparatus in the first exemplary embodiment will be described with reference to the flowchart shown in FIG. 2.

The display apparatus executes a normal processing, that is, the decoding unit 2 decodes a broadcast data received with the broadcast receiving unit 1 and the synchronizing unit 3 transmits the decoded video data and the decoded sound data to the output unit 4 at the timing represented by the time-stamp (Step 201).

During its processing, the channel selection unit 5 monitors whether or not a user selects the other channels (Step 202).

And then, the channel selection unit 5 transmits the information which represents the frequency or the channel selected by a user to the broadcast receiving unit 1 when it is detected that the user changes the channel to the other channels. In addition, the channel selection unit 5 transmits a notification which shows that the channel is newly selected to the decoding unit 2 and the synchronizing unit 3 (Step 203).

After the notification is received from the channel selection unit 5, the decoding unit 2 judges whether or not the video data received from the broadcasting unit 1 is the key frame data, that is, whether or not it is the key frame (the first key frame) received at first after the reception of the notification (after the channel selection) (Step 204).

The decoding unit 2 deletes the frame (non-reference frame) which is not the key frame (Step 205).

When it is detected that the video data of the first key frame is received after receiving the notification (after the channel selection), the decoding unit 2 decodes the first key frame and transmits the decoded key frame to the synchronizing unit 3 (Step 206).

The synchronizing unit 3 immediately transmits the first key frame to the output unit 4 without matching the timing (normal displaying time) which the time-stamp attached to the first key frame represents when the first key frame is input from the decoding unit 2 after the notification is received from the channel selection unit 5 (after the channel selection) (Step 207). After the outputting, the display apparatus returns to Step 201 and performs the normal operation.

The synchronizing unit 3 may immediately transmit the sound frame corresponding to the first key frame, in addition the first key frame, to the output unit 4 after the channel selection. As a result, the output unit 4 displays the video based on the first key frame and also output the sound corresponding to the first key frame.

In the above-mentioned example, the key frame is the frame which can be watched as a perfect video (image) with single frame like an I frame by demodulating. In contrast, for example, the key frame may be a frame which can be watched as a perfect video (image) with a part of a frame like intra-micro block which needs no differentiation among P (Predictive) pictures of MPEG-2 by demodulating. In this way, the key frame is set suitably according to the communication system.

According to the first exemplary embodiment, the display apparatus starts to display the key frame (the reference frame) before the original displaying time. Hence, without waiting for long time just after the channel selection, a user can watch the first video frame.

<A Second Exemplary Embodiment>

The second exemplary embodiment will be described below. In addition, the same reference numbers are used for the similar configurations as the first exemplary embodiment, and the detailed description will be omitted.

According to the first exemplary embodiment mentioned above, the display apparatus starts to display the video based on the first key frame before the original displaying time (normal displaying time; normal displaying timing) after the channel selection. However, the display apparatus displays the video of following to the video frame with matching the normal displaying timing. In contrast, in this second exemplary embodiment, the display apparatus displays the video of the first key frame and the video, which is received in a time period from a timing at when the first key frame is displayed until a timing in when a predetermined period finishes, earlier than the normal displaying time. The display apparatus gradually sets the display timing for the video frames closer to the normal displaying timing.

That is, according to this second exemplary embodiment, in addition to the first exemplary embodiment, the synchronizing unit 3 has a function of adjusting as follows the timing in which the video frame is transmitted to the output unit 4 during a time period from displaying the first key frame after the channel selection until finishing the predetermined period. In other words, it is assumed that a time span (a time period) from that the synchronizing unit 3 transmits earlier the first key frame to the output unit 4 after channel selection until that the synchronizing unit 3 transmits the video frame to the output unit 4 at the normal displaying timing is T (second). Also, it is assumed, after the channel selection, that a time span (a time period) which is a time difference between a timing represented in the time-stamp attached to the first key frame and a timing represented in the time-stamp attached to the frame following to the first key frame is n (second). The synchronizing unit 3 adjusts the timing in which the video frame is transmitted to the output unit 4 based on the T (second) and the n (second).

A specific example is described below. For example, it is assumed that the time when the synchronizing unit 3 transmits the first key frame to the output unit 4 can be set 1 second earlier than the normal displaying time by the hardware performance or like. It is assumed that the time span (predetermined period) T from the timing represented in the time-stamp attached to the first key frame until the timing when the synchronizing unit 3 transmits the video frame to the output unit 4 at the normal displaying time is 10 seconds. In such case, a time when the video frame (hereinafter, it may be referred to as the video frame N) which will be displayed primarily at the n-th second from the timing represented in the time-stamp attached to the key frame is actually displayed can be obtained as described below. That is, the time (displaying timing) $t_n$ when the video frame N is displayed can be calculated by the following an equation (1), if it is that the timing represented in the time-stamp attached to the key frame is 0 second.

$$t_n = n(\text{second}) - (10(=T \text{ second}) - (n \text{ second})) \div 10 \quad (1)$$

Based on the equation (1), the frame (the key frame) of the 0th second is displayed at −1 second as compared to the original time. The following frame is displayed at the timing which approaches to the original displaying time gradually, and the 10th frame is displayed at the timing which is the normal displaying time represented the time-stamp. By using the equation (1), the above-mentioned synchronizing processing can be realized. The synchronizing unit 3 transmits the video frame to the output unit 4 at the timing represented in the time-stamp after it begins to transmit the video frame at the timing represented in the time-stamp (here, after the tenth second).

Further, in the predetermined period after the channel selection, the synchronizing unit 3 may execute the following processing. For example, it is assumed that a time difference between the timing represented in the time-stamp and the timing when the first key frame is displayed earlier than it is set to L (second). It is assumed that the time span from the timing represented in the time-stamp attached to the first key frame until matching the timing when the synchronizing unit 3 transmits the video frame to the output unit 4 at the normal displaying time is T (second). The synchronizing unit 3 may transmit the frame to the output unit 4 every interval timing which is given by dividing a sum of the L (second) and the T (second) by the number of the frame displayed in the sum time period.

In the second exemplary embodiment, as mentioned above, the display apparatus adjusts the timing displaying the frame by using at least the time span (period, T (second)) from the timing represented in the time-stamp attached to the first key frame until matching the timing when the synchronizing unit 3 transmits the video frame to the output unit 4 at the normal displaying time. For this reason, even if the first key frame is displayed earlier after the channel selection, unnatural watching due to dropping the following video frame will be avoided. In this way, by using the display apparatus of this second exemplary embodiment, a user cannot only watch the first one frame early just after the channel selection, but the user can also watch the frame smoothly after that. And it gets enable to watch the broadcast at the timing represented in the time-stamp after a moment.

<A Third Exemplary Embodiment>

The third exemplary embodiment will be described below. In addition, the same reference numbers are used for the similar configurations as each exemplary embodiment, and the detailed description will be omitted.

In this third exemplary embodiment, in addition to the second exemplary embodiment, the synchronizing unit 3 includes the configuration that transmits not only the video frame but also the sound frame corresponding to the video frame after the channel selection.

That is, in this third exemplary embodiment, the synchronizing unit 3 includes the configuration which transmits the sound frame to the output unit 4 in the predetermined period after the channel selection, based on the same equation (2) as the equation (1) represented in the second exemplary embodiment.

$$t_n = n(\text{second}) - (10(=T \text{ second}) - (n \text{ second})) \div 10 \quad (2)$$

Here, the $t_n$ represents the timing when the sound frame is actually output. That sound frame is originally output at the n-th second from the timing represented in the time-stamp attached to the first key frame after the channel selection. It is assumed that the timing is 0 second when represented in the time-stamp attached to the first key frame after the channel selection. It is assumed that the T represents the time span (the predetermined period) from the timing represented in the time-stamp attached to the first key frame after the channel selection until matching the timing when the synchronizing unit 3 transmits the sound frame to the output unit 4 at the normal displaying time.

Further, the synchronizing unit 3 may executes a processing concerning to the sound frame as described below in the predetermined period after the channel selection. For example, it is assumed that a time interval is L (second) when the sound frame corresponded to the first key frame is shown earlier than the timing represented in the time-stamp. It is assumed that the time is T (second) from the timing represented in the time-stamp attached to the first key frame until matching the timing when the synchronizing unit 3 transmits the sound frame to the output unit 4 at the normal displaying time. The synchronizing unit 3 may transmit the sound frame to the output unit 4 for each time which is given by dividing the sum of those L (second) and T (second) by the number of the key frame displayed in the sum time period.

However, when the above-mentioned processing is executed, the silent interval takes place between the sound frame, and the sound gets intermittent. It is difficult to understand the content if the sound is not output continuously. Thus, the practicality of the display apparatus declines by the sound intermittence as mentioned above. Accordingly, in order to prevent such problem, the partial sample of each sound frame may be repeated. The sound may reproduce slowly by a filter processing for the repeated data. As a result, the sound intermittence can be avoided.

In the above-mentioned example, the synchronizing unit 3 transmits the video frame and the sound frame with matching both of their timing. In stead of this, the synchronizing unit 3 immediately transmits only the sound frame corresponding the key frame just after the channel selection, in contrast, the video frame may be transmitted at the time represented in the time-stamp.

According to the third exemplary embodiment, a user can begin to listen to the sound data just after the channel selection.

<A Fourth Exemplary Embodiment>

The fourth exemplary embodiment will be described below. In addition, in the description of this fourth exemplary embodiment, the same reference numbers are used for the similar configuration as the exemplary embodiments mentioned above, and the detail description will be omitted.

In this fourth exemplary embodiment, the configuration of the display apparatus will be described, the configuration is to display a subtitle data immediately just after the channel selection.

That is, the subtitle data is the data transmitted in text style, is not the transmitted data with the difference information between the previous data like the video data. For this reason, the concept such as the key frame does not usually exist like the video data. In the subtitle data, a management data which constitutes the data structure is transmitted. If it is not after the timing of receiving this management data, the subtitle data cannot often be decoded.

Hence, in the fourth exemplary embodiment, in addition to each of the exemplary embodiment, the decoding unit 2 has a function of deleting the received subtitle data during the period until receiving first the management data concerning to the subtitle data after the channel selection. The synchronizing unit 3 has a function of executing the same processing for the subtitle data as the video frame processing in the first exemplary embodiment. As a result, the display apparatus enables to display the subtitles earlier just after the channel selection.

The synchronizing unit 3 may execute the same processing for the subtitle data as the video frame processing in the second exemplary embodiment in addition to the above-mentioned subtitle processing. In other words, the synchronizing unit 3 transmits the subtitle data received in the predetermined period after the channel selection earlier than the normal displaying time based on the management data. As a result, the display apparatus displays the subtitles earlier than the normal displaying time. In the above-mentioned predetermined period, the synchronizing unit 3 matches the earlier transmission timing gradually toward the normal displaying time. As a result, the display apparatus can display the subtitles smoothly after the channel selection, and can realize the display with small uneasiness.

<A Fifth Exemplary Embodiment>

The fifth exemplary embodiment will be described below. In addition, in the description of this fifth exemplary embodiment, the same reference numbers are used for the similar configuration as the exemplary embodiments mentioned above, and the detail description will be omitted.

In the fifth exemplary embodiment, in addition to each of the exemplary embodiment, the decoding unit 2 has a function of decoding as follows without deleting the video frame (non-reference frame) which is received until receiving the first key frame just after the channel selection.

That is, in MPEG-2 video, the video cannot be originally reproduced from the P picture (P frame) which is the difference information with the key frame. In contrast, in this fifth exemplary embodiment, it is assumed that a black I picture (I frame) has been transmitted as the key frame just after the channel selection, for example. The decoding unit 2 has a function of decoding the P frame referring to the dummy key frame.

In the fifth exemplary embodiment, the display apparatus enables to display the video rather earlier after the channel selection. The display apparatus gradually displays the video frame which is not the key frame just after the channel selection even though it is the broadcast data whose key frame interval is long. As a result, the display apparatus can reduce a waiting time for a user after the channel selection effectively.

The display apparatus in each above-mentioned exemplary embodiment can not only be composed by hardware but also realized by computer program, as clearly in above-mentioned. In case of such configuration, the program is stored in the program memory (program recording medium). By a processor operating with program stored in the program memory, the same function and operation as each of the exemplary embodiment mentioned above is realized. Further, the partial function of the exemplary embodiment mentioned above can be realized by computer program.

<An Other Exemplary Embodiment>

The present invention is not limited to the configuration of each above-mentioned exemplary embodiment, and may adopt various exemplary embodiments. For example, the display apparatus in each of the above-mentioned exemplary embodiment may be included in the communication apparatus such as a mobile phone. In other words, the display apparatus in each of the exemplary embodiment may compose the communication apparatus.

Figure 3:
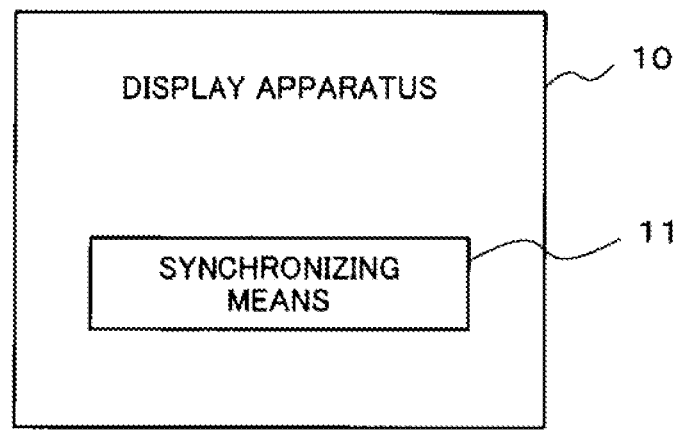
FIG. 3 is a drawing which illustrates an other exemplary embodiment in the display apparatus.

In addition, as the other exemplary embodiment of the display apparatus, the configuration of a display apparatus 10 shown in FIG. 3 may also be adopted. That is, the display apparatus 10 includes a synchronizing means 11 as follows. The synchronizing means 11 has a function of displaying the video of the first predetermined reference frame which is received and decoded after the channel selection, earlier than the original displaying time based on the time information attached to the information of the reference frame.

Figure 4:
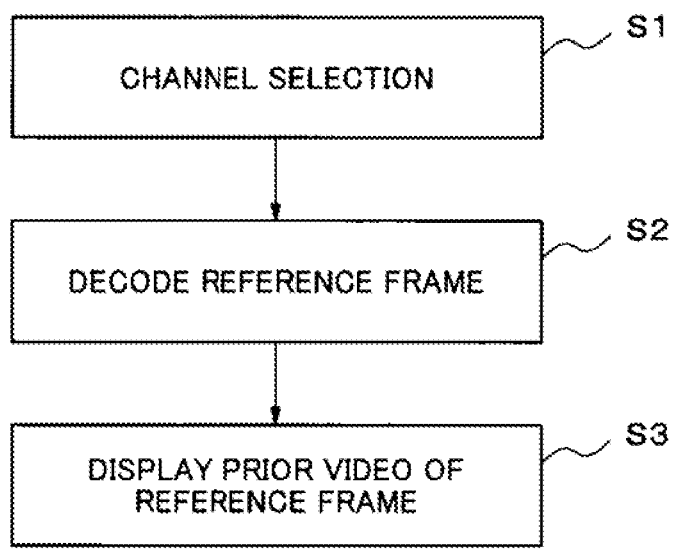
FIG. 4 is a drawing which illustrates an other exemplary embodiment of the displaying method.

For example, the display apparatus 10 employs a operation procedure for displaying as shown in FIG. 4. That is, after the channel is selected (Step S1), the display apparatus 10 decodes a video signal of the first predetermined reference frame received after the channel selection (Step S2).

And the display apparatus 10 displays a video of the reference frame after decoding earlier than the original displaying time based on time information attached to the information of the reference frame (Step S3).

Figure 5:
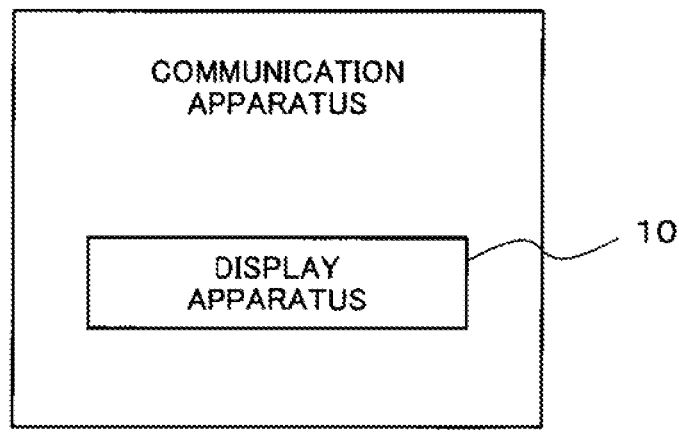
FIG. 5 is a drawing which illustrates one embodiment of a communication apparatus.

The display apparatus 10 can compose the communication apparatus as shown in FIG. 5.

Figure 6:
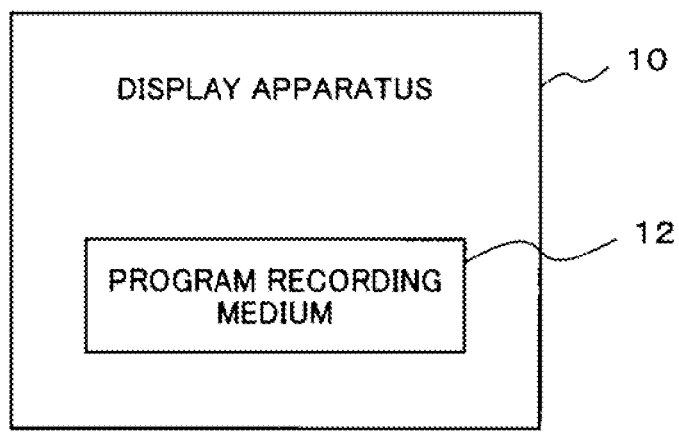
FIG. 6 is a drawing which shows a program recording medium implemented in the display apparatus.

For example, the function of the display apparatus 10 can be realized by a control operation based on a program which is recorded in a program recording medium 12 as shown in FIG. 6. The program of the program recording medium 12 is for implementing the function to decode the video signal of the first predetermined reference frame which is received after the channel selection and the function to display the video of the decoded reference frame earlier than the original displaying time based on the time information attached to the information of the reference frame, to the display apparatus.

A display apparatus in other exemplary embodiment decodes a first input reference frame (a video frame which becomes one video or a part of video by decoding) after the channel selection, and displays the decoded video frame earlier than the original displaying time.

A display apparatus in more other exemplary embodiment decodes the first input video frame after the channel selection in the case of being the reference frame (the video frame which becomes one video or a part of video by decoding), or decodes the first input video frame referring to the dummy frame in the case of being the frame representing the difference with the reference frame, and displays the decoded video frame earlier than the original displaying time.

Furthermore, in a displaying method of other exemplary embodiment, a display apparatus decodes a first input reference frame (a video frame which becomes one video or a part of video by decoding) after the channel selection and displays the decoded video frame earlier than the original displaying time.

Furthermore, in a display method of more other exemplary embodiment, a display apparatus the first input video frame after the channel selection in the case of being the reference frame (the video frame which becomes one video or a part of video by decoding), or decodes the first input video frame referring to the dummy frame in the case of being the frame representing the difference with the reference frame, and displays the decoded video frame earlier than the original displaying time.

In an exemplary embodiment of a display system, a display apparatus decodes the first input reference frame (video frame which becomes one video or a part of video by decoding) after the channel selection and displays the decoded video frame earlier than the original displaying time.

In other exemplary embodiment of a display system, a display apparatus the first input video frame after the channel selection in the case of being the reference frame (the video frame which becomes one video or a part of video by decoding), or decodes the first input video frame referring to the dummy frame in the case of being the frame representing the difference with the reference frame, and displays the decoded video frame earlier than the original displaying time.

The program stored in the display apparatus may make a display apparatus execute the processing of decoding the first input video frame after the channel selection in the case of being the reference frame (video frame which becomes one video or a part of video by decoding), and may execute the processing of displaying the decoded video frame earlier than the original displaying time.

Furthermore, the program stored in the display apparatus may make a display apparatus execute the processing of decoding the first input video frame after the channel selection in the case of being the reference frame (video frame which becomes one video or a part of video by decoding), or may make a display apparatus execute the processing of decoding the first input video frame referring to the dummy frame in the case of being the frame representing the difference with the reference frame, and may make a display apparatus execute the processing of displaying the decoded video frame earlier than the original displaying time.

In other exemplary embodiment mentioned above, the display apparatus can enjoy the effect that can avoid increase of load and begin to display a video selected in promptly after channel selection like each of the first to fifth exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

Concerning to a display apparatus or the like which displays a video received with digital broadcasting and so on, the present invention is effective for not only TV sets but also the display apparatus of the communication apparatus equipped with TV display function.

REFERENCES SIGNS LIST 1 broadcast receiving unit
2 decoding unit
3 synchronization unit
4 output unit
5 channel selection unit

The invention claimed is:

1. A displaying method comprising:
   decoding a predetermined reference frame continuously after receiving the reference frame, wherein the reference frame is a frame which is received through a communication network from outside at first after channel selection; and
   adjusting a timing, in which a video based on the decoded reference frame is displayed, toward shifting earlier than a time originally displaying the video based on a time information attached to the reference frame.

2. The displaying method according to claim 1, further comprising:
   adjusting a time, in which a video based on a video frame following to the reference frame in a predetermined period is displayed, earlier than a normal displaying time based on the time information attached to the video frame, and adjusting the timing so as to shorten a time difference between the time in which the video frame is displayed actually and the normal displaying time as time passes.

3. The displaying method according to claim 1, wherein the predetermined period is a time period between the timing when the video based on the reference frame starts to display and a timing when a predetermined time passed since starting to display the video.

4. The displaying method according to claim 1, further comprising:
   adjusting a time to output a sound based on a sound frame corresponding to the reference frame so as to match the timing displaying the video based on the reference frame.

5. The displaying method according to claim 4, further comprising:
   adjusting a timing, in which a sound is output based on a sound frame following to the sound frame corresponding to the reference frame in a predetermined period, earlier than a normal outputting time based on a time information attached to the sound frame, and adjusting the timing so as to shorten a time difference between the timing in which the sound frame is output actually and the normal outputting time as time passes.

6. The displaying method according to claim 1, further comprising:
   adjusting a timing, in which a subtitle data received at first after receiving a management data managing a subtitle first after channel selection is displayed, earlier than a normal time when the subtitle data is displayed based on the management data.

7. The displaying method according to claim 6, further comprising:
   adjusting a timing, in which the subtitle data received in a predetermined period following to the subtitle data displayed at first after channel selection is displayed, earlier than a normal displaying time based on the management data, and adjusting the timing so as to shorten a time difference between a timing in which the subtitle data is displayed actually and the normal displaying time as time passes.

8. The displaying method according to claim 1, further comprising:
   decoding a predetermined non-reference frame referring to a predetermined hypothetical reference frame in a case of receiving the non-reference frame prior to the reference frame after channel selection; and
   adjusting a timing, in which a video based on the decoded non-reference frame is displayed, toward shifting earlier than a normal time displaying the video based on a time information attached to the non-reference frame.

9. A non-transitory program recording medium storing a program to make a display apparatus have a function, the function achieved by performing the program comprising:
   decoding a predetermined reference frame continuously after receiving the reference frame, wherein the reference frame is a frame which is received through a communication network from outside at first after channel selection; and
   adjusting a time, in which a video based on the decoded reference frame is displayed, toward shifting earlier than a a time originally displaying the video based on a time information attached to the reference frame.

10. The non-transitory program recording medium according to claim 9, the function achieved by performing the program further comprising:
    adjusting a time, in which a video based on a video frame following to the reference frame in a predetermined period is displayed, earlier than a normal displaying time based on the time information attached to the video frame, and adjusting the timing so as to shorten a time difference between the timing in which the video frame is displayed actually and the normal displaying time as time passes.

11. The non-transitory program recording medium according to claim 9, the function achieved by performing the program further comprising:
    adjusting a timing to output a sound based on a sound frame corresponding to the reference frame so as to match the timing displaying the video based on the reference frame.

12. The non-transitory program recording medium according to claim 9, the function achieved by performing the program further comprising:
    adjusting a timing, in which a sound is output based on a sound frame following to the sound frame corresponding to the reference frame in a predetermined period, earlier than a normal outputting time based on a time information attached to the sound frame, and adjusting the timing so as to shorten a time difference between the timing in which the sound frame is output actually and the normal outputting time as time passes.

13. The non-transitory program recording medium according to claim 9, the function achieved by performing the program further comprising:
    adjusting a timing, in which subtitle data, received at first after receiving a management data managing a subtitle first after channel selection is displayed, earlier than a normal time when the subtitle data is displayed based on the management data.

14. The non-transitory program recording medium according to claim 13, the function achieved by performing the program further comprising:
    adjusting a timing, in which the subtitle data received in a predetermined period following to the subtitle data displayed at first after channel selection is displayed, earlier than a normal displaying time based on the management data, and adjusting the timing so as to shorten a time difference between a timing in which the subtitle data is displayed actually and the normal displaying time as time passes.

15. The non-transitory program recording medium according to claim 9, the function achieved by performing the program further comprising:
    decoding a predetermined non-reference frame referring to a predetermined hypothetical reference frame in a case of receiving the non-reference frame prior to the reference frame after channel selection; and adjusting a timing, in which a video based on the decoded non-reference frame is displayed, toward shifting earlier than a normal time displaying the video based on a time information attached to the non-reference frame.

* * * * *